Dec. 3, 1968          H. VISSERS          3,413,940
INSTRUMENT FOR INJECTING A GAS OR LIQUID INTO THE SOIL
Original Filed Aug. 1, 1967          3 Sheets-Sheet 2
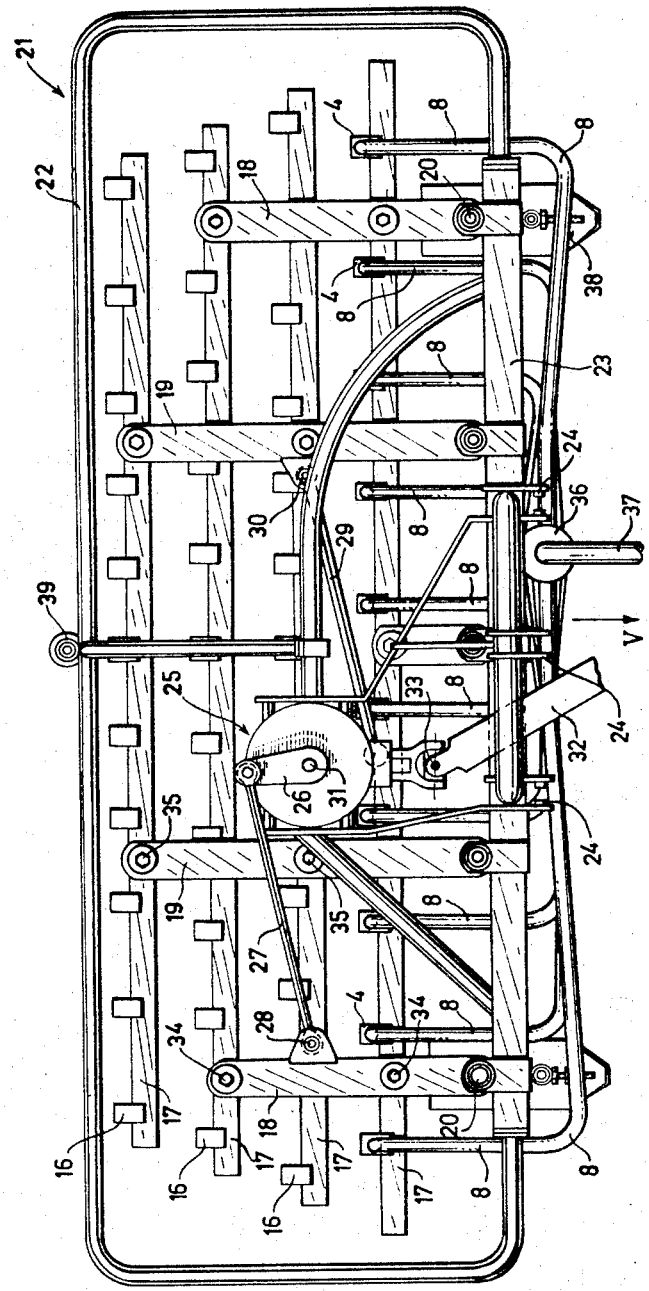
INVENTOR.
HERBERT VISSERS
BY Ennice & Smiley
ATTYS.

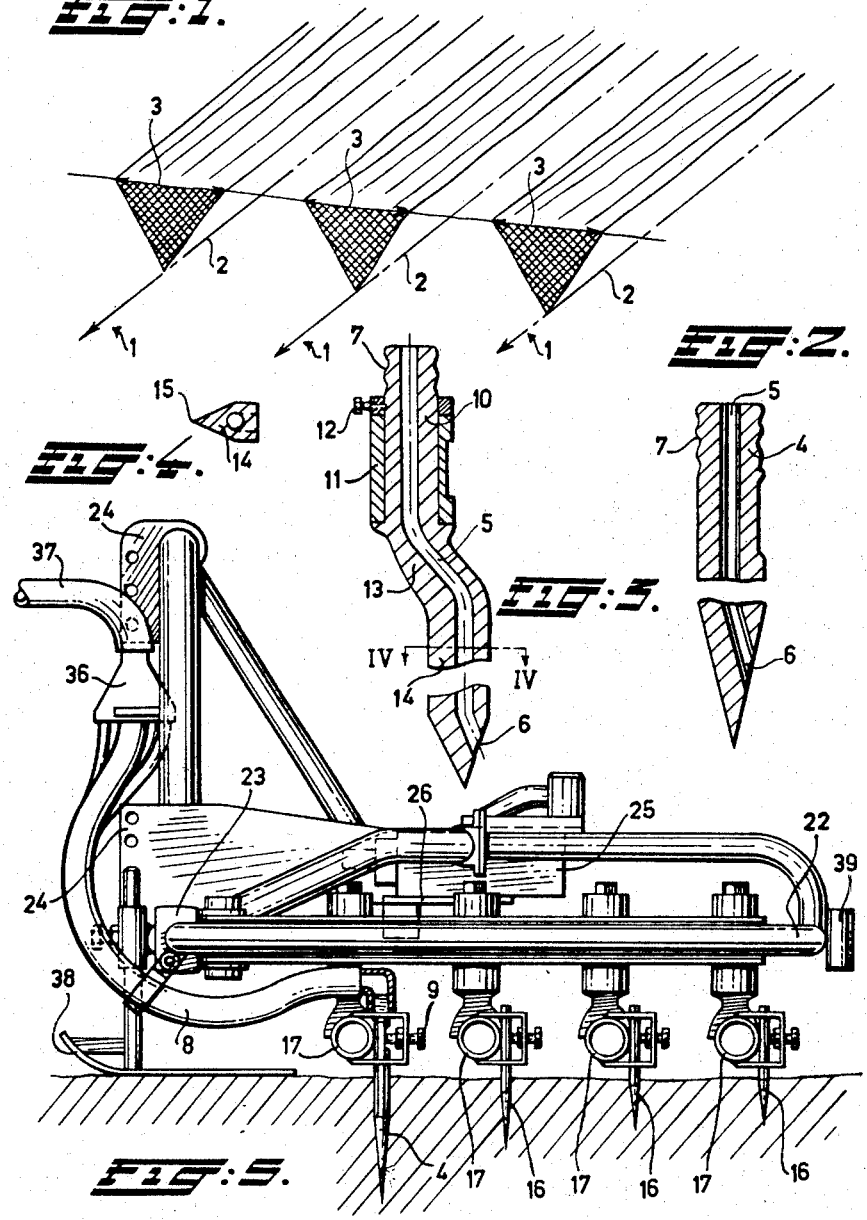

Dec. 3, 1968 H. VISSERS 3,413,940
INSTRUMENT FOR INJECTING A GAS OR LIQUID INTO THE SOIL
Original Filed Aug. 1, 1967 3 Sheets-Sheet 3
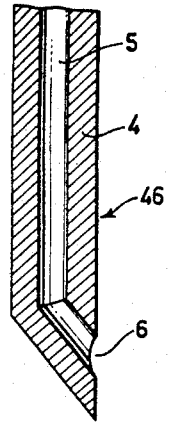
FIG:10.
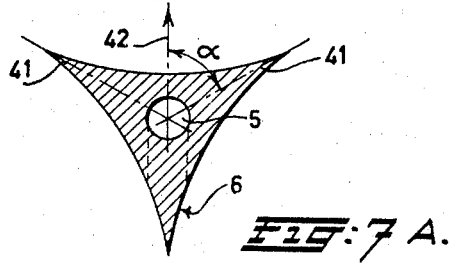
FIG:7A.
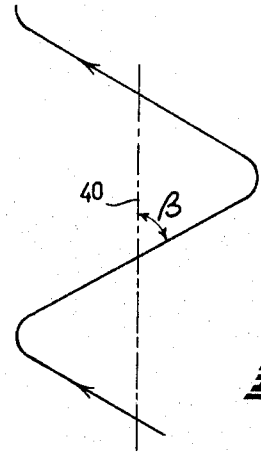
FIG:7B.
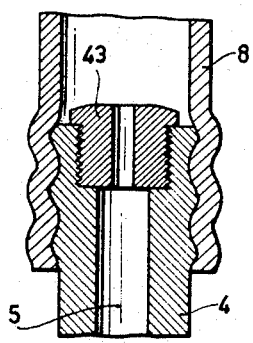
FIG:8.
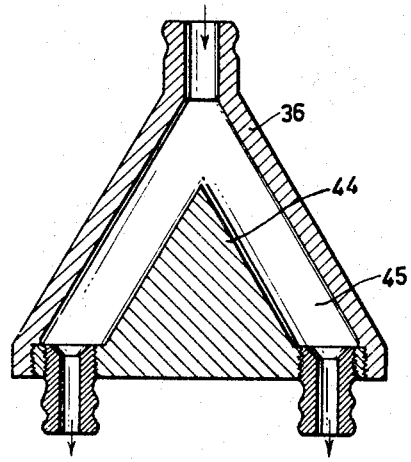
FIG:9.
INVENTOR.
HERBERT VISSERS
BY
Imirie & Smiley
Attys.

United States Patent Office 3,413,940
Patented Dec. 3, 1968

3,413,940
INSTRUMENT FOR INJECTING A GAS OR
LIQUID INTO THE SOIL
Herbert Vissers, Spoorstraat 4,
Nieuw-Vennep, Netherlands
Continuation of application Ser. No. 657,629, Aug. 1,
1967, which is a continuation-in-part of application Ser.
No. 523,689, Jan. 28, 1966. This application Mar. 13,
1968, Ser. No. 712,866
Claims priority, application Netherlands, Feb. 3, 1965,
6501345
7 Claims. (Cl. 111—7)

ABSTRACT OF THE DISCLOSURE

Implement for injecting ammonia into the ground by means of a harrow having time carrying beams reciprocating transverse to the direction of travel of the implement, the foremost tines being hollow and the ammonia passing through these reciprocating tines The present application is a continuation of application Ser. No. 657,629, filed Aug. 1, 1967, which is a continuation-in-part of the parent application filed Jan. 28, 1966, and having the Ser. No. 523,689 by the same named inventor, both applications now abandoned.

The invention relates to an implement for injecting a gas or liquid, e.g., ammonia, into the soil, comprising a frame, a plurality of spaced tines supported in said frame, each time being movable through the ground, a number of foremost tines being provided with a channel, opening in the vicinity of the lower end thereof, the other end of the channel being connected to a supply source of said gas or liquid.

Such an implement is used to introduce exact quantities of fertilizer into the soil, whereby, f.i., liquid ammonia is introduced at a defined depth by means of these injection tines; the ammonia is converted into the gas phase and disperses in the ground.

According to the known implement a plurality of juxtaposed injection tines is drawn through the ground by means of a tractor. As the gaseous ammonia rises fast, it is of importance that the furrow made by the injection tine is covered again as rapidly as possible in order to restrict the loss of gas to a minimum. In spite thereof no optimum distribution of the ammonia gas in the ground is obtained by this method; the released quantity of gas is in fact only available in a strip of land which has a triangular section, the tip of the injection tine being the apex and the ground surface the base of this triangle.

It is evident that even in this limited space no uniform distribution of the ammonia gas can be obtained, whilst the upper layer of the worked area is only fertilized if the spacing of the tines is very small and the ammonia is injected at the rather great depth, whereby the bases of the areas of dispersion overlap one another. The application of a large number of tines results, however, in the drawback that the device is expensive and a great pull is required for its advance.

The injection of ammonia by means of hollow tines pulled through the ground inevitably gives local concentrations of nitrogen in the soil with adjacent places having a concentration which is too low. This is the reason why in the prior art implements it was impossible to introduce the seed into the ground immediately after the fertilizing operation. There was the risk of burned seed at the location with a high concentration and an inferior growth of the crop at the locations with a small concentration of fertilizer. This drawback was especially pronounced when after the seeding operation a drought occurred.

In view of the above considerations it has been necessary to perform the fertilizing operation, i.e., the injection of ammonia at an earlier moment in order to be sure that even under unfavorable weather conditions the nitrogen has sufficient time to penetrate into the ground and to level out unequal concentrations. The best period for fertilizing under these conditions was January/February, i.e., at least one month prior to the seeding operation. This means that the injection should take place in frozen or only recently defrosted soil. This gave rise to agricultural problems so that the farmers have tried to combine the fertilizing operation with the ploughing of the soil in the period of November/December. However, four months later i.e. in March/April during the seeding operation the ammonia was mainly evaporated.

It is an object of the invention to obviate these disadvantages and to provide a simple device with which a good distribution of the ammonia in the bottom can be achieved while applying a limited number of tines.

This object is achieved in the implement according to the invention in that the hollow tines as well as at least the majority of the other tines are mounted for reciprocation in a direction transverse to the travel direction of the implement.

Due to this feature the hollow injection tines perform a zig-zag path of a much greater length per surface unit than ordinary stationary tines pulled through the ground. This produces a much better repartition of the liquid or gas in the ground, which advantage combined with the mixing of the ground by means of the reciprocating harrow tines, makes it possible to combine at least two agricultural operations, i.e., the preparation of the seed bed and the injection of fertilizer.

A further advantage of the implement according to the invention is, that due to the reciprocating movement a smaller number of hollow tines can be used than with the prior art stationary tines. The losses by means of evaporation are also reduced as the furrows drawn by the hollow tines are imediately closed again by the following harrow tines.

The new implement also renders it possible to inject the gas or liquid at a reduced depth thereby obtaining a sufficient equal repartition without evaporation losses. The reduced injection depth as well as the reduced number of hollow tines entail a power reduction and an energy economy.

It is another object of the invention to enable the tines, to be easily pressed in a downward direction into the ground when one starts to use the implement, and to prevent the outflow aperture from being obstructed.

The invention further aims to achieve that the outflow aperture is always directed toward the rear as contemplated in the direction of movement of the tine notwithstanding the zig-zag path; thus preventing the tine from being obstructed.

Another object of the invention is to produce a very uniform distribution of the ammonia, whilst keeping the depth at which the ammonia is to be injected smaller than in the conventional methods.

The foregoing and other objects and advantages of the invention will appear in the description to follow. In the description reference is made to the accompanying drawings, which form a part hereof, and in which there is shown by way of illustration and not of limitation a specific form in which the invention may be embodied.

In the drawings:

FIGURE 1 represents the way in which the ammonia is distributed in the bottom by using the prior art implement, containing stationary injection tines, which are pulled through the ground;

FIGURE 2 is a longitudinal section of an injection tine to be used in the implement according to the invention;

FIGURE 3 shows a longitudinal section of another embodiment of an injection tine;

FIGURE 4 shows a cross section of this tine according to the line IV—IV in FIGURE 3;

The FIGURES 5 and 6 are a side elevation and a plan view respectively of an implement with rows of tines which are movable in a transverse direction, the front row consisting of hollow tines;

The FIGURES 7A and 7B show a horizontal cross section of a third modified embodiment of a hollow tine and a plan view of the path followed by each injection tine on moving through the ground, respectively;

FIGURE 8 is a vertical longitudinal section of the upper end of a hollow injection tine with a hose connection;

FIGURE 9 shows an embodiment of a supply pipe or distribution head of the implement according to the FIGURES 5 and 6;

FIGURE 10 shows a vertical longitudinal section of a fourth embodiment of a hollow injection tine.

FIGURE 1 indicates in outline within which area the ammonia is spread when one proceeds in the usual way. It is assumed that the injection tines are advanced in the direction of the arrows 1; the ammonia is then available in the areas with a triangular cross section (hatched in this figure), the apex line corresponding with the path 2 followed by the outflow aperture (indicated in this figure by a dot-and-dash line) and by the base 3 being situated at the ground surface. Since the quantity of ammonia issuing from the outflow aperture is released on one point and should spread over the entire hatched surface it is evident that a uniform distribution will never be produced. The upper layer of the ground is only then entirely provided with nitrogen when the bases 3 of adjacent areas overlap or at least touch one another by the edges. The latter circumstance prevails when a large number of tines and a great injection depth are applied, the disadvantages, however, are already explained in the preamble.

According to the invention the tines are carried by an element which is reciprocated in transverse direction. Before going into this further the preferred tine shape will be clarified with reference to the FIGURES 2 and 3. The injection tine 4 of circular or polygonal cross section is provided with a channel 5 which opens into an outflow aperture 6 closely above the tip. Circular grooves 7 are provided in the upper part of the tine 4, the said grooves serving to facilitate the fastening of a feed hose 8 (see FIGURES 5 and 8).

In the event of cylindrical tines a flat face is provided at the location of the clamping bolt 9 in order to ensure that the outflow aperture 6 is always at the back.

FIGURE 3 shows a longitudinal section of a tine which is so mounted on the beam that it is rotatable about its own axis. The tine consists of a cylindrical part 10 provided with grooves 7 on the upper side, the cylindrical part being accommodated in a sleeve 11 so as to snugly fit therein and secured against displacement in the longitudinal direction by means of a lock screw 12 which fits in a groove of the cylindrical part. The cylindrical part 10 merges via a portion 13 into the part 14, the centre line of the latter being staggered in respect of the centerline of the part 10. In this way it is achieved that the outflow aperture 6 of the channel 5 is always on the back of the tine thus preventing obstruction of this outflow aperture.

FIGURE 4 shows a cross section through the lower part 14 of the tine according to FIGURE 3. As is visible the tine has a cutting edge 15 with which grass and weed are cut through and which prevents the tines from taking along strings.

The FIGURES 5 and 6 show an embodiment of a complete implement comprising four rows of tines which are reciprocable in transverse direction, the foremost row consisting of hollow injection tines 4. The three more rearward lying rows are ordinary harrow tines 16. These tines 4 and 16 are secured by means of clamping bolts 9 against beams 17 supported in a way indicated in FIGURE 6 by longitudinal arms 18 and 19. The arms 18 and 19 are pivotally connected at 20 to a frame 21 consisting of a tubular part 22 and a front part 23. At its front side the frame 21 is provided with a three point hitch 24 for connection with a tractor (not shown).

Within the frame 21 is mounted a driving mechanism 25, consisting of two cranks 26 which are angularly displaced over about 180°. The upper crank 26 shown in FIGURE 6 is connected through a rod 27 and a pivot 28 with the arm 18. The lower crank 26 (not visible in FIGURE 6) is connected through a rod 29 and a pivot 30 with one of the arms 19. The cranks 26 are rotated around a common axis 31 from a conical gear box (not shown) driven by the power take off shaft of the tractor via a connecting axle 32 and a universal coupling 33.

As will be clear from FIGURE 6 the first and third beam 17 are pivotally connected by 34 with the short arms 18, whilst the second and fourth beam are connected through the pivots 35 with the long arm 19. A rotation of the driving mechanism 25 will result in a reciprocation of the beams 17 such that adjacent beams will move in opposite direction. The speed and throw of the foremost beam 17, bearing the injection tines 4 are small and these values increase stepwise for the more rearward positioned beams 17. An implement of this kind, only adapted to perform a harrow operation is described in the U.S. patent application Ser. No. 508,998 in the name of Joost Gijzenberg.

The hoses 8 are at one end connected with the injection tines 4 in a manner as will be described in connection with FIGURE 8. At the other end these hoses are connected to a distribution head 36 shown in the FIGURES 5 and 9. This head is connected through a pipe 37 with a supply of liquid or gas contained in a reservoir supported by the tractor (not shown).

In order to support the implement on the correct height above the ground, there are two shoes 38 mounted under the front part 23 of the frame 21. At the rear there is a tubular element 39 into which an additional support might be inserted when the implement is disconnected from the tractor.

Indicated in FIGURE 7B is the path followed by the tines 4 on moving through the ground. This path is a zig zag one, the straight parts of the path enclosing an angle $\beta$ with the direction of advance 40. The hollow tine according to the modified embodiment shown in FIGURE 7A can be used as a fixed (i.e., nonrotatable) tine, that is to say in conformity with the embodiment shown in FIGURE 2, the two cutting edges 41, symmetrically situated on either side of the symmetry plane 42, being directed according to an angle $\alpha$ which corresponds with the angle $\beta$ of the resultant of the forward movement of the device and the transverse movement of the row of tines. These cutting edges 41 constitute as it were a doubling of the cutting edge 15 from FIGURE 4.

FIGURE 8 shows that each hollow tine 4 on its upper end is provided with an interchangeable throttle nipple 43. Some advantages are obtained herewith. In the first place the pressure drop in the gaseous ammonia fed under some overpressure does not take place earlier than in the tine 4, so that ice formation, if any, in the hose 8 is prevented. With the aid of the interchangeable throttle nipple 43 it is furthermore possible to adjust the quantity of gas or liquid flowing from each hollow tine to the desired value.

Depicted in FIGURE 9 is a common supply pipe which is an enlarged longitudinal section of the supply head 36 in FIGURE 5, the said pipe being embodied as a round distribution head with a substantially triangular cross section. In the interior is a central upright cone 44 so that an annular supply gully 45 is formed which via a number of flexible hoses 8 (not represented) is connected with the row of hollow tines capable of reciprocation. It has been experimentally proven that with such a distribution head a very uniform supply of material towards each of the connected hollow injection tines is achieved.

FIGURE 10 shows an embodiment of a hollow injection tine 4 of which the channel 5 opens into an aperture 6 on the back 46, the latter contrary to the front side being straight, so that in the operative position this side 46 is substantially vertical. In this way soil particles are prevented from penetrating into the tine on lowering same into the ground.

For the sake of clearness straight injection tines are represented in FIGURE 5, it is, however, obvious that tines of the type according to FIGURE 3 can also be mounted on the foremost beam, the cylindrical sleeve 11 being clamped to the beam through a bolt 9.

The operative depth of the injection tines 4 and the harrow tines 16 is adjusted in such a way that the depth of the injection tines is greater than the operative depth of the harrow tines. It has appeared that in this way an adequate closure of the furrows drawn by the injection tines can be obtained.

The implement described hereabove allows not only for a uniform distribution of the ammonia in the bottom with a minimum of losses, but moreover the ground is thoroughly mixed up so that in most cases no further harrowing is necessary and seeding might be performed at once.

While a preferred embodiment of the invention has been shown and described, it is to be understood that changes and variations may be made without departing from the spirit and scope of the invention as defined in the appended claims.

I claim:
1. A subterranean injecting device comprising, in combination,
   a frame adapted to be drawn behind a towing vehicle,
   a plurality of carriers disposed on said frame,
   means mounting said carriers on said frame for relative movement of the carriers traversely with respect to the direction of movement of the frame,
   a row of hollow injecting tines attached to a leading one of said carriers in depending relation thereto for penetrating the earth's surface, said row of tines extending transversely of the direction of movement of said frame,
   a row of harrow tines attached to at least one of said carriers trailing behind said one carrier and supporting said row of harrow tines substantially parallel with said row of injecting tines,
   means for supplying material to be injected to said hollow injecting tines,
   and drive means carried by said frame and including mechanism connected to said carriers to move same back and forth across the furrows made by said injecting tines.

2. The device according to claim 1 wherein said mounting means comprises arms pivotally mounted on said frame and pivotally connected with said carriers thereto, whereby the row of harrow tines are swept through an arc which sweeps back and forth across the furrows made by said injecting tines.

3. The device according to claim 1 wherein each injecting tine terminates in a point at its lower end defined in part by a flat, substantially vertical rear surface, the hollow interior of the tine opening upon said rear surface.

4. The device according to claim 1 wherein the supply means includes a container for the material, a distributor connected to the container and having a plurality of outlets individually connected to said injecting tines.

5. The device according to claim 4 wherein said distributor includes a cylindrical inner wall surface and an upstanding conical bottom wall surface defining an annular gully therewith, and said outlets being in communication with said gully at circumferentially spaced points therearound.

6. The device according to claim 1 wherein each hollow tine includes a cylindrical upper section and a lower section axially offset from the upper section, said upper section being rotatably mounted in said carrier whereby the lower section is free to swivel with respect to said carrier as the carrier translates with respect to the frame.

7. The device as defined in claim 1 wherein each injecting tine is provided with a forwardly facing front wall defining cutting edges along its opposite sides, said cutting edges facing in the direction along the resultant of the combined movements of said frame and carrier.

References Cited

UNITED STATES PATENTS

| | | | |
|---|---|---|---|
| 32,599 | 6/1861 | Foster | 172—102 XR |
| 147,874 | 2/1874 | Smith | 111—11 |
| 1,717,911 | 6/1929 | Brewer | 111—7 |
| 3,186,496 | 6/1965 | Gijzenberg | 172—102 |

ROBERT E. BAGWELL, *Primary Examiner.*